US012784231B2

(12) United States Patent
Kogai et al.

(10) Patent No.: US 12,784,231 B2
(45) Date of Patent: Nov. 3, 2026

(54) IMAGE PROCESSING APPARATUS, IMAGE CAPTURING APPARATUS, CONTROL METHOD, AND STORAGE MEDIUM

(71) Applicant: CANON KABUSHIKI KAISHA, Tokyo (JP)

(72) Inventors: Yukihiro Kogai, Kanagawa (JP); Toru Aida, Tokyo (JP); Yasushi Ohwa, Tokyo (JP); Takahiro Usami, Tokyo (JP); Hiroyasu Katagawa, Kanagawa (JP); Hiroyuki Yaguchi, Chiba (JP); Tomotaka Uekusa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 476 days.

(21) Appl. No.: 18/301,320

(22) Filed: Apr. 17, 2023

(65) Prior Publication Data

US 2023/0360229 A1 Nov. 9, 2023

(30) Foreign Application Priority Data

May 6, 2022 (JP) ................................ 2022-076749

(51) Int. Cl.
*G06T 7/20* (2017.01)
*G03B 13/36* (2021.01)
(Continued)

(52) U.S. Cl.
CPC ................ *G06T 7/20* (2013.01); *G03B 13/36* (2013.01); *G06T 7/70* (2017.01); *G06V 10/60* (2022.01);
(Continued)

(58) Field of Classification Search
CPC .. G06T 7/12; G06T 7/248; G06T 7/73; G06T 2207/10016; G06T 2207/20021; G06T 2207/30224; G06T 7/20
(Continued)

(56) References Cited

U.S. PATENT DOCUMENTS

2010/0119109 A1* 5/2010 Kim ........................ G06T 7/246 382/103
2011/0311100 A1* 12/2011 Fan ........................ G06T 7/248 382/103
(Continued)

FOREIGN PATENT DOCUMENTS

JP 2001-060269 A 3/2001
JP 2015-172797 A 10/2015
JP 2021-197729 A 12/2021

OTHER PUBLICATIONS

Mar. 6, 2026 Japanese Official Action in Japanese Patent Appln. No. 2022-076749.

*Primary Examiner* — Stephen P Coleman
(74) *Attorney, Agent, or Firm* — Venable LLP

(57) ABSTRACT

An image processing apparatus for tracking an image of a predetermined object included in an input captured image includes acquiring the captured image, executing tracking processing to identify a position of the image of the predetermined object included in the captured image, executing the tracking processing using different matching methods, acquiring situation information indicating a state of the predetermined object and/or an image capture situation of the captured image, and switching, on a basis of the situation information, to executing the tracking processing using either a first tracking unit or a second tracking unit on a basis of the captured image. The matching method used by the first tracking unit has a lower power consumption associated
(Continued)

with executing the tracking processing than the matching method used by the second tracking unit.

22 Claims, 11 Drawing Sheets

(51) Int. Cl.

| | |
|---|---|
| ***G06T 7/70*** | (2017.01) |
| ***G06V 10/60*** | (2022.01) |
| ***G06V 10/75*** | (2022.01) |
| ***G06V 10/764*** | (2022.01) |
| ***H04N 23/61*** | (2023.01) |

(52) U.S. Cl.
CPC .......... *G06V 10/751* (2022.01); *G06V 10/764* (2022.01); *H04N 23/61* (2023.01); *G06V 2201/07* (2022.01)

(58) Field of Classification Search
USPC .......................................................... 382/107
See application file for complete search history.

(56) References Cited

U.S. PATENT DOCUMENTS

2012/0106790 A1* 5/2012 Sultana ................ G06V 40/164 382/103
2019/0043207 A1* 2/2019 Carranza ................ G06V 20/52
2019/0130579 A1* 5/2019 Heo ................... G02B 27/0093
2023/0116274 A1 4/2023 Usami

* cited by examiner

| TYPE | MATCHING METHOD |
|---|---|
| DOG, CAT, BIRD | FEATURE POINT MATCHING |
| TRAIN, CAR | TEMPLATE MATCHING |
| PERSON (WHOLE BODY) | FEATURE POINT MATCHING |
| FACE, PUPIL | TEMPLATE MATCHING |
| OTHER | TEMPLATE MATCHING |

IMAGE PROCESSING APPARATUS, IMAGE CAPTURING APPARATUS, CONTROL METHOD, AND STORAGE MEDIUM

CROSS-REFERENCE TO PRIORITY APPLICATION

This application claims the benefit of Japanese Patent Application No. 2022-076749, filed May 6, 2022, which is hereby incorporated by reference herein in its entirety.

BACKGROUND OF THE INVENTION

Field of the Invention

The present invention relates to an image processing apparatus, an image capturing apparatus, a control method, and a storage medium, and particularly relates to an object tracking technique.

Description of the Related Art

An image capturing apparatus such as a digital camera is provided with a function (object tracking function) for detecting an object in a captured field of view from a captured image and tracking the specified object over time. With an object tracking function, there are various known matching methods for identifying the position of an image of an object determined to be the same as a tracing target object. One matching method is described in Japanese Patent Laid-Open No. 2001-060269. In this template matching method, an object area in a captured image is registered as a template image, and then in subsequently obtained captured images, an area with high correlation with the template image is identified.

SUMMARY OF THE INVENTION

The present invention has been made in consideration of the aforementioned problems and provides an image processing apparatus, an image capturing apparatus, a control method, and a storage medium for switching between matching methods depending on the image capture situation and the state of an object and executing appropriate object tracking.

The present invention in its first aspect provides an image processing apparatus for tracking an image of a predetermined object included in an input captured image, comprising at least one processor and/or circuit configured to function as following units: a first acquiring unit configured to acquire the captured image; a tracking unit configured to execute tracking processing to identify a position of the image of the predetermined object included in the captured image, the tracking unit including a first tracking unit and a second tracking unit configured to execute the tracking processing using different matching methods; a second acquiring unit configured to acquire situation information indicating a state of the predetermined object and/or an image capture situation of the captured image; and a control unit configured to, on a basis of the situation information, switch to executing the tracking processing using either the first tracking unit or the second tracking unit on a basis of the captured image acquired by the first acquiring unit; wherein the matching method used by the first tracking unit has a lower power consumption associated with executing the tracking processing than the matching method used by the second tracking unit.

The present invention in its second aspect provides an image capturing apparatus, comprising: an image capture unit configured to output a captured image; and the image processing apparatus of the first aspect.

The present invention in its third aspect provides a control method for an image processing apparatus for tracking an image of a predetermined object included in an input captured image, the image processing apparatus functioning as a tracking unit configured to execute tracking processing to identify a position of the image of the predetermined object included in the captured image, the tracking unit including a first tracking unit and a second tracking unit configured to execute the tracking processing using different matching methods, the control method comprising: acquiring the captured image; acquiring situation information indicating a state of the predetermined object and/or an image capture situation of the captured image; and on a basis of the situation information, switching to executing the tracking processing using either the first tracking unit or the second tracking unit on a basis of the captured image, wherein the matching method used by the first tracking unit has a lower power consumption associated with executing the tracking processing than the matching method used by the second tracking unit.

The present invention in its fourth aspect provides a computer-readable storage medium storing a program configured to cause a computer to function as the units of the image processing apparatus of the first aspect.

Further features of the present invention will become apparent from the following description of exemplary embodiments (with reference to the attached drawings).

DESCRIPTION OF THE EMBODIMENTS

First Embodiment

Figure 1:
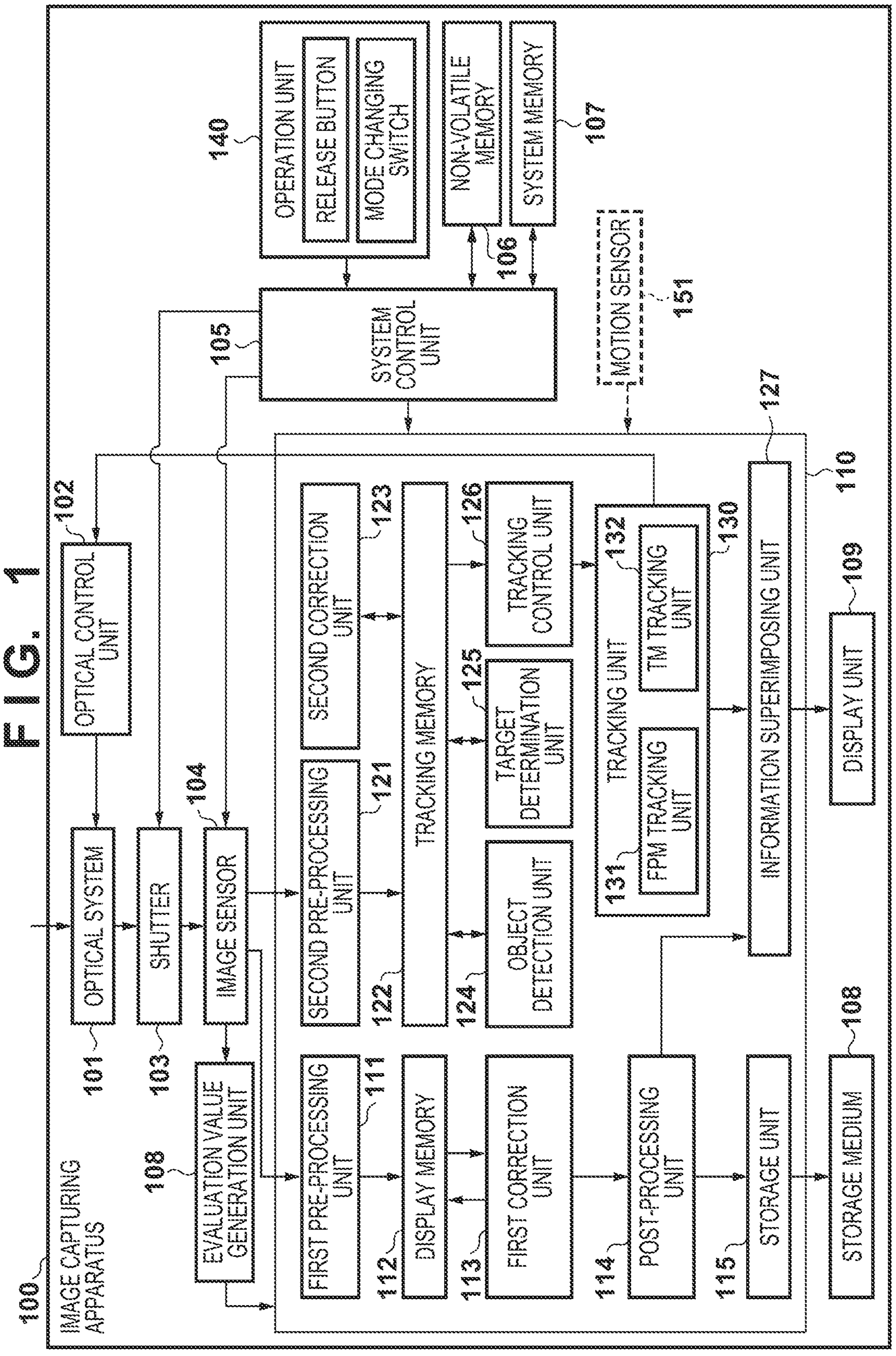
FIG. 1 is a block diagram illustrating an example of the functional configuration of an image capturing apparatus 100 according to embodiments and modifications of the present invention.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

In the embodiment described below, the present invention is applied to an image capturing apparatus, an example of an image processing apparatus, provided with a tracking function for tracking a main object over time in captured images obtained via intermittent image capture. However, the present invention can be applied to a discretionary device that can track a main object over time in captured images obtained via intermittent image capture.

Configuration of Image Capturing Apparatus 100

FIG. 1 is a block diagram illustrating a functional configuration of an image capturing apparatus 100 according to the present embodiment. The image capturing apparatus 100 according to the present embodiment described below includes the components indicated by solid lines in the diagram. In other words, components indicated by a dashed line in the diagram are not included in the image capturing apparatus 100 according to the present embodiment.

An optical system 101 includes a plurality of lenses including a movable lens such as a focus lens and forms an optical image of the image capture area on an image forming surface of an image sensor 104 described below.

An optical control unit 102 derives a defocus amount for each one of a plurality of focus detection areas by capturing an optical image formed by the optical system 101 via a phase detection autofocus sensor, for example. A focus detection area may be a predetermined rectangular area in an imaging surface, for example. The optical control unit 102 determines a focus detection area for focusing the optical system 101 on the basis of the calculated defocus amount and a tracking result from a tracking unit 130 described below. Then, the optical control unit 102 drives the focus lens of the optical system 101 on the basis of the defocus amount derived for the determined focus detection area. In this manner, the optical system 101 is made to focus on the object in the determined focus detection area.

A mechanical shutter (hereinafter, simply referred to as a shutter) 103 is provided between the optical system 101 and the image sensor 104. The shutter 103 is used to control the exposure time (shutter speed) of the image sensor 104 when capturing a still image. The operation of the shutter 103 is controlled by a system control unit 105 described below.

The image sensor 104 may be a Complementary Metal Oxide Semiconductor (CMOS) image sensor including a primary color Bayer array color filter, for example. A plurality of pixels with photoelectric conversion areas are disposed in a two-dimensional arrangement in the image sensor 104. The image sensor 104 converts the optical image formed by the optical system 101 via the plurality of pixels into an electrical signal group (analog image signal). The analog image signal is converted into a digital image signal (image data) via an A/D converter included in the image sensor 104. The A/D converter may be provided external to the image sensor 104.

The system control unit 105 is a CPU, for example. The system control unit 105 reads out an operation program of each block included in the image capturing apparatus 100 stored in a non-volatile memory 106, for example, loads the operation program on a system memory 107, and executes the operation program to control the operation of each block. The non-volatile memory 106 is a storage apparatus that can permanently store information and may be an EEPROM that can electrically erase and store information, for example. The non-volatile memory 106, in addition to the operation program of each block, stores parameters such as constants required for the operation of each block, GUI data, and the like. The system memory 107 is a storage apparatus such as a RAM or the like that can temporarily store information, for example. The system memory 107 is used as a loading area for loading each block as well as a storage area for storing information output by the operation of each block. Note that the system control unit 105 is communicatively connected to each block, though a portion is omitted in FIG. 1.

An evaluation value generation unit 108 derives a signal or evaluation value used in automatic focus detection (AF) and an evaluation value (brightness information) used in automatic exposure control (AE) from the image data output from the image sensor 104. In the present embodiment described herein, the evaluation value generation unit 108 derives brightness information by executing color conversion of an integrated value obtained by integration of the color filter pixels (red, blue, green). However, the brightness information may be derived by a different method. The evaluation value derived by the evaluation value generation unit 108 is used in control of the optical system 101 by the optical control unit 102, determination of image capture conditions by the system control unit 105, and various types of processing in an image processing unit 110 described below.

The image processing unit 110 uses image data output from the image sensor 104, for example, to execute various types of image processing for displaying and storing use and object tracking use. The blocks associated with the different uses will be described separately below. Note that the blocks associated with displaying and storing use and tracking use may be implemented by different hardware, for example, different circuits in the image processing unit 110, or may be implemented by a common piece of hardware.

Functional Configuration Associated with Displaying and Storing Use A first pre-processing unit 111 applies color interpolation processing to the image data output from the image sensor 104. Color interpolation processing is also referred to as demosaic processing and is processing that includes converting each piece of image data forming the image data into image data of the RGB format including a value of the R component, G component, and B component. Also, the first pre-processing unit 111 may apply resize processing to decrease the number of pixels as necessary. The first pre-processing unit 111 stores the image data obtained by applying the processing in a display memory 112.

A first correction unit 113 applies correction processing including white balance correction processing, shading correction processing, and the like, conversion processing from the RGB format to the YUV format, and the like to the image data stored in the display memory 112. Note that in the correction processing process, the first correction unit 113 can process multiple lines of image data by controlling the reading out of data from the display memory 112 and the writing of data to the display memory 112. Also, the first correction unit 113 may execute correction processing using, from among the image data stored in the display memory 112, the image data of one frame or more that is different from the processing target frame. The first correction unit 113 outputs the image data obtained by applying the processing to a post-processing unit 114.

The post-processing unit 114 generates image data for storage and an image for display from the YUV formatted image data supplied from the first correction unit 113. The post-processing unit 114 applies encoding processing on the image data, for example, and generates a data file storing the encoded image data as image data for storage. The post-processing unit 114 supplies the image data for storage to a storage unit 115. Also, the post-processing unit 114 generates image data for display to be displayed on a display unit 109 from image data supplied from the first correction unit 113. The image data for display has a size corresponding to the display size on the display unit 109. The post-processing unit 114 supplies the image data for display to an information superimposing unit 127.

The storage unit 115 stores the image data for storage converted by the post-processing unit 114 on a storage medium 108. The storage medium 108 may be a semiconductor memory card including an SD memory card, a CompactFlash (registered trademark), or the like or may be a built-in non-volatile memory or the like in the image capturing apparatus 100.

Functional Configuration Associated with Tracking Use

A second pre-processing unit 121 applies color interpolation processing to the image data output from the image sensor 104. The second pre-processing unit 121 stores the image data (RGB formatted image data for tracking) obtained by applying the processing in a tracking memory 122. Also, the second pre-processing unit 121 may apply resize processing to decrease the number of pixels as necessary to decrease the processing load.

A second correction unit 123 applies correction processing including white balance correction processing, shading correction processing, and the like, conversion processing from the RGB format to the YUV format, and the like to the image data for tracking stored in the tracking memory 122. Also, the second correction unit 123 may apply image processing appropriate for object detection processing to the image data for tracking. When a representative brightness (for example, the average brightness of all pixels) of the image data for tracking is not more than a predetermined threshold, for example, the second correction unit 123 may multiply the entire image data for tracking by a constant coefficient (gain) to increase the representative value to at least the threshold. The second correction unit 123 stores the image data for tracking obtained by applying the processing in the tracking memory 122. Note that as with the first correction unit 113, the second correction unit 123 may execute correction processing using multiple lines of image data for tracking or the image data for tracking of multiple frames. Also, hereinafter, the image data for tracking obtained by the correction being applied by the second correction unit 123 and made usable in the various types of processing associated with tracking may be referred to simply as the captured image.

An object detection unit 124 detects one or more areas (candidate areas) for a predetermined candidate object (object) from the image data for tracking of one frame obtained by the correction being applied by the second correction unit 123 and outputs information (object information) indicating the state of the object. Object information includes information indicating the type (human body, face, cat, dog, and the like) of the candidate object corresponding to the candidate area and the position and size (area) of the candidate area for each candidate area detected from the target frame. Also, object information includes information of the number (object number) of candidate areas detected in the target frame. The object detection unit 124 can detect candidate areas using a known technique for detecting a feature area such as a face area of a person or animal. For example, teacher data can be used to configure the object detection unit 124 as a trained class discriminator. The algorithm used in the discriminator may be discretionarily selected and may be a random forest, a neural network, or the like.

A target determination unit 125 determines an area (tracking object area) of a main object (tracking object) corresponding to the tracking target from the candidate areas detected by the object detection unit 124. The tracking object area is determined on the basis of the type of the candidate object, the size of the candidate area, and the like, for example. The tracking object area may be determined on the basis of a predetermined priority order using a method of prioritizing a person (face), a method of prioritizing a candidate area closest to a user-specified position, or the like. The target determination unit 125 stores the information for identifying the determined tracking object area in the tracking memory 122.

A tracking control unit 126 executes control to cause the tracking unit 130 to execute tracking processing to identify, from a captured image associated with the subsequent frame, an area indicating an image of the tracking object determined by the target determination unit 125. In the present embodiment, regarding the tracking object once determined by the target determination unit 125, instead of the target determination unit 125 determining the tracking object area again for the captured image associated with the subsequent frame, the tracking unit 130 determines the candidate area corresponding to the same object as the tracking object area. This is how main object image tracking is realized.

The tracking unit 130 according to the present embodiment is provided with two types of tracking units (FPM tracking unit 131 and TM tracking unit 132) for identifying the tracking object area using different matching methods and executes tracking processing using one of these tracking units via control by the tracking control unit 126. The FPM tracking unit 131 and the TM tracking unit 132 are both tracking units that use a matching method that does not use a machine learning model. In other embodiments of the present invention, another tracking unit of a different matching method, such as a matching method that uses a machine learning model, may be provided. However, the present embodiment is premised on a situation that demands the tracking processing to be executed while reducing power consumption such as when setting power saving settings, and the tracking unit 130 executes control to switch between the two tracking units that use a matching method that does not use a machine learning model.

The Feature Point Matching (FPM) tracking unit 131 executes tracking processing using a feature point matching method for identifying an area similar in distribution of a feature point obtained for the tracking object area. The FPM tracking unit 131 first detects a feature point for the tracking object area determined by the target determination unit 125 for one frame and derives a feature amount associated with an image of the tracking object on the basis of the detected feature point. This will be described below in detail. Also, the FPM tracking unit 131 detects a feature point for each candidate area detected by the object detection unit 124 for the subsequent frame and tracks the candidate area indicating a feature point distribution similar to the feature amount associated with the image of the tracking object as an area associated with the same tracking object.

The Template Matching (TM) tracking unit 132 executes tracking processing using a template matching method for registering an image of the tracking object area detected from in the captured image as a template image and identifying an area with high correlation to the template image. Specifically, the TM tracking unit 132 stores the pixel pattern (for example, one-dimensional information of a brightness signal of pixel data, lightness, hue, three-dimensional information of a color saturation signal, and the like) of the template image as a feature amount of the tracking object area. Then, for a captured image of a frame input thereafter, the TM tracking unit 132 identifies an area with high correlation to the feature amount of the template image and tracks this area as an area associated with the tracking object.

In this manner, when tracking processing is executed by the FPM tracking unit 131 or the TM tracking unit 132 in the tracking unit 130, information indicating whether the tracking object has moved to a position in the captured image is derived. The information (center position and size (how large) of the tracking object area) derived by the tracking unit 130 is output to the optical control unit 102 and used in the focus control, is output to the information superimposing unit 127 and used in the presentation of information, and the like, for example.

The information superimposing unit 127 generates an image of a tracking frame on the basis of the size information of the tracking object area output by the tracking unit 130. For example, the image of the tracking frame may be a frame-like image representing the outline of a rectangle bounding the tracking object area. Then, the information superimposing unit 127 superimposes the image of the tracking frame on the image data for display output by the post-processing unit 114 with the tracking frame displayed at the center position of the tracking object area and generates combined image data. The information superimposing unit 127 may also generate images representing the current setting value, state, and the like of the image capturing apparatus 100, and the post-processing unit 114 may superimpose these images on the image data for display output by the post-processing unit 114 with the images displayed at predetermined positions. The combined image data generated by the information superimposing unit 127 is output to the display unit 109 and displayed. By displaying, on the display unit 109, the combined image data generated by sequentially executing the processing on the image data output by the image sensor 104, a live view display (provided with a tracking frame at the tracking object area) presenting the tracking result can be realized. Here, the display unit 109 may be a liquid crystal display or an organic EL display, for example.

An operation unit 140 is a user interface is provided in the image capturing apparatus 100 for acquiring various types of operation inputs from the user. The image capturing apparatus 100 according to the present embodiment includes various types of operation members including a release button and a mode changing switch as the user interface. When the operation unit 140 detects an operation input to these operation members, the operation unit 140 outputs a control signal corresponding the operation input to the system control unit 105.

The release button in this example includes a switch SW1 turned ON with a half press and a switch SW2 turned on with a full press. The system control unit 105 recognizes the ON control signal of the SW1 as a still image capture preparation instruction and the ON control signal of the SW2 as a still image capture start instruction and executes operations according to the instructions. Specifically, in response to the SW1 signal, operations including autofocus (AF) processing, automatic exposure (AE) processing, automatic white balance (AWB) processing, pre-flash emission (EF) processing, and the like are started by the system control unit 105. Also, in response to the SW2 signal, the system control unit 105 controls the entire system so that an image capture processing series of operations from reading out of a signal from the image sensor 104 to writing of image data to the storage medium 108 is started.

The mode changing switch switches the operation mode of the system control unit 105 to any one of a still image capturing mode, a video capturing mode, a playback mode, or the like. Modes included in the still image capturing mode are an automatic image capturing mode, an automatic scene determination mode, a manual mode, an aperture priority mode (Av mode), and a shutter speed priority mode (Tv mode). Also, various types of scene modes, which include image capturing settings specific to respective image capturing scenes, a program AE mode, and custom modes are also included. One of the modes included in a menu button can be directly switched to via the mode changing switch. Alternatively, after switching to the menu button via the mode changing switch, one of the modes included in the menu button may be switched to using another operation member. In a similar manner, the video capturing mode may include a plurality of modes.

Other operation members include, for example, directional buttons, a set button, an end button, a return button, a next image button, a jump button, a filter button, a change attribute button, a menu button, and the like. For example, a menu screen where various types of settings can be set by pressing the menu button is displayed on the display unit 109. The user can operate the directional buttons or the set button of the menu screen displayed on the display unit 109 to set various types of settings.

Feature Point Matching Method Tracking Processing

Figure 2:
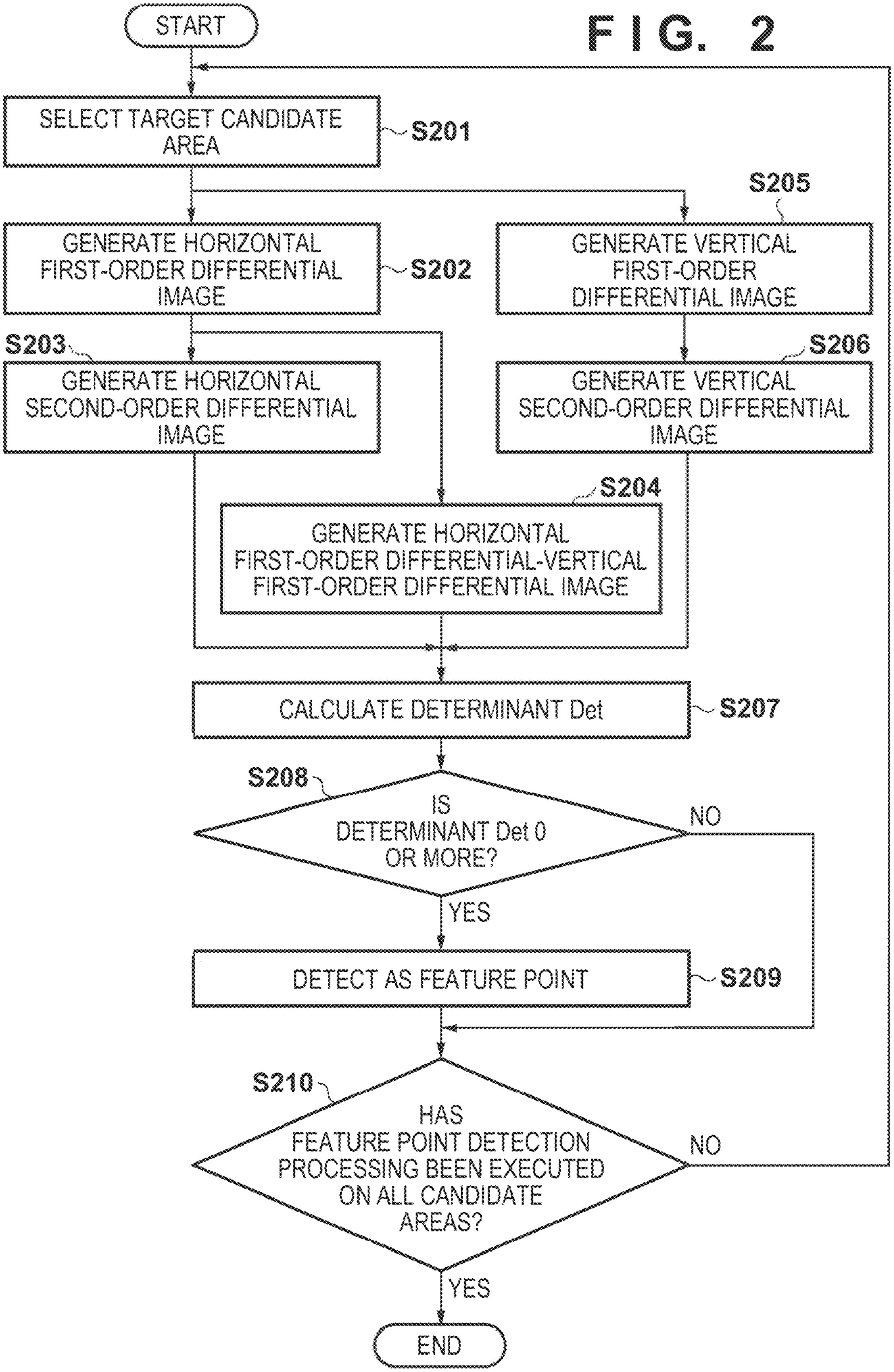
FIG. 2 is a flowchart for describing tracking processing using a feature point matching method according to embodiments and modifications of the present invention.

The tracking processing using a feature point matching method executed by the FPM tracking unit 131 described above will be described below with reference to the drawings. In the present embodiment, image data of one or more candidate areas detected by the object detection unit 124 is input into the FPM tracking unit 131, and the FPM tracking unit 131 executes feature point detection, feature amount derivation, and feature point association for each candidate area as part of the tracking processing process. Note that tracking object area determination and feature point detection and feature amount derivation of the tracking object area are executed before the start of the present tracking processing. First, the processing for detecting a feature point for image data of a candidate area will be described using the flowchart in FIG. 2.

In step S201, the FPM tracking unit 131 selects, as a target candidate area, one candidate area for which feature point detection has not yet been executed from the input candidate area image data.

In step S202, the FPM tracking unit 131 generates a horizontal first-order differential image by executing horizontal first-order differential filter processing on the image data of the target candidate area. Then, in step S203, the FPM tracking unit 131 generates a horizontal second-order differential image by further executing horizontal first-order differential filter processing on the horizontal first-order differential image obtained in step S202. Also, in step S204, the FPM tracking unit 131 generates a horizontal first-order differential-vertical first-order differential image by further executing vertical first-order differential filter processing on the horizontal first-order differential image obtained in step S202.

Also, in step S205, the FPM tracking unit 131 generates a vertical first-order differential image by executing vertical first-order differential filter processing on the image data of the target candidate area. Then, in step S206, the FPM tracking unit 131 generates a vertical second-order differential image by further executing vertical first-order differential filter processing on the vertical first-order differential image obtained in step S205.

In step S207, the FPM tracking unit 131 calculates a determinant Det of a Hessian matrix H of differential values (differential image) obtained in steps S203, S204, and S206. Here, the Hessian matrix H and the determinant Det can be represented as follows, wherein the horizontal second-order differential value obtained in step S203 is defined as Lxx, the vertical second-order differential value obtained in step S206 is defined as Lyy, and the horizontal first-order differential-vertical first-order differential value obtained in step S204 is defined as Lxy.

$$H = \begin{bmatrix} L_{xx} & L_{xy} \\ L_{xy} & L_{yy} \end{bmatrix}$$

$$\text{Det} = L_{xx} * L_{yy} - L_{xy}^2$$

In step S208, the FPM tracking unit 131 determines whether the determinant Det obtained in step S207 is not less than 0. When the FPM tracking unit 131 determines that the determinant Det is not less than 0, the processing transitions to step S209. When the FPM tracking unit 131 determines that the determinant Det is less than 0, the processing transitions to step S210.

In step S209, the FPM tracking unit 131 detects the point where the determinant Det is not less than 0 as a feature point of the target candidate area.

In step S210, the FPM tracking unit 131 determines whether or not feature point detection processing has been executed on all of the input candidate areas. When the FPM tracking unit 131 determines that feature point detection processing has been executed on all of the candidate areas, the present processing ends. When the FPM tracking unit 131 determines otherwise, the processing returns to step S201.

Figure 3:
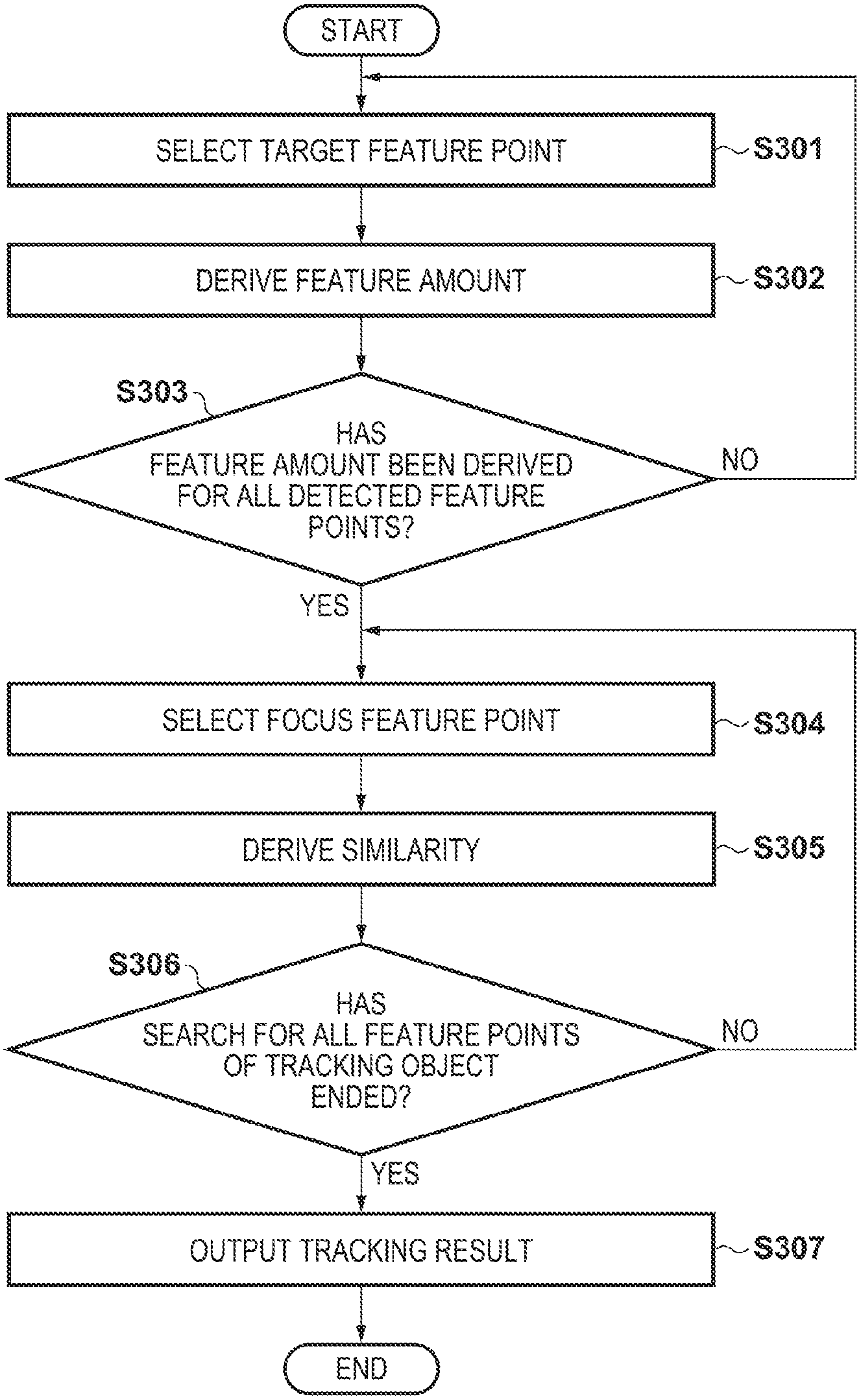
FIG. 3 is another flowchart for describing tracking processing using a feature point matching method according to embodiments and modifications of the present invention.

Next, processing to derive the feature amount of each candidate area on the basis of the feature point detected in this manner and detect the similarity with a pre-registered tracking object area will be described using the flowchart in FIG. 3.

In step S301, the FPM tracking unit 131 selects, as a target feature point, one detected feature point for which feature amount derivation has not yet been executed from the feature point (detected feature points) detected for the image data of all of the input candidate areas.

Figures 4, 5:
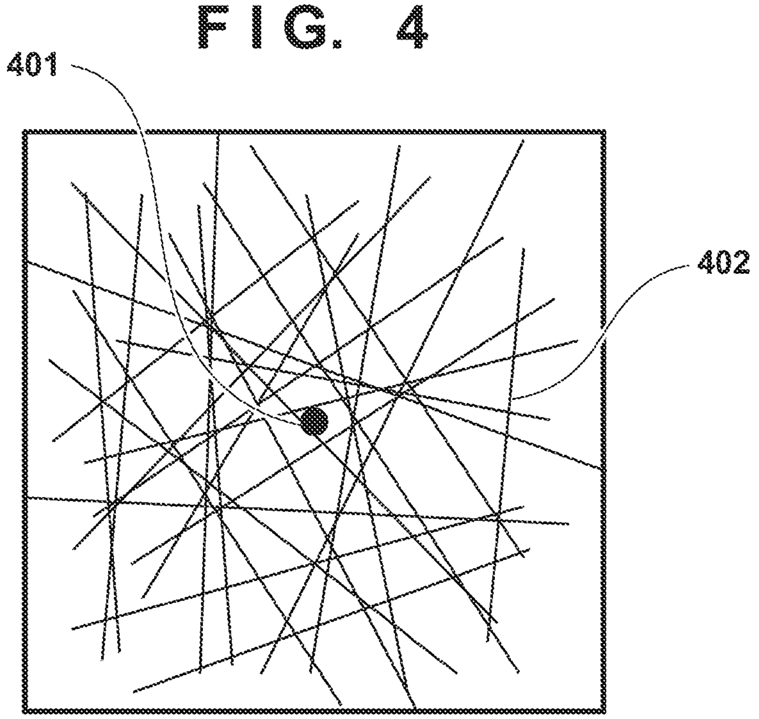
FIG. 4 is a diagram for describing tracking processing using a feature point matching method according to embodiments and modifications of the present invention.
FIG. 5 is a diagram for describing tracking control processing according to a first embodiment of the present invention.

In step S302, the FPM tracking unit 131 derives the feature amount for the target feature point. FIG. 4 is a schematic diagram illustrating an overview of the feature amount derivation processing. The FPM tracking unit 131 focuses on a target feature point 401, introduces a random line segment pattern 402, and expresses the magnitude relationship of luminance values of both ends of each line segment as a 1, 0 bit string to derive the feature amount of the target feature point.

In step S303, the FPM tracking unit 131 determines whether or not the feature amounts for all of the detected feature points have been derived. When the FPM tracking unit 131 determines that the feature amounts for all of the detected feature points have been derived, the processing transitions to step S304. When the FPM tracking unit 131 determines that the feature amounts have not been derived, the processing returns to step S301.

In step S304, the FPM tracking unit 131 selects, as a focus feature point to search for (match with) a similar detected feature point, a feature point for which similarity has not yet been derived from the feature points associated with the tracking object area.

In step S305, the FPM tracking unit 131 derives the similarity between the focus feature point and each detected feature point for the image data of all of the candidate areas. In the present embodiment, the similarity between these feature points is derived as a Hamming distance D between feature amounts of feature points. Specifically, the Hamming distance D can be derived as follows, wherein a bit string of the feature amount of the focus feature point is defined as A, the element included in this bit string is defined as Ai, the bit string of the feature amount of the detected feature point for similarity to be derived is defined as B, and the element included in this bit string is defined as Bi.

$$D = \sum_{i}^{N} xor(A_i, B_i)$$

In step S306, the FPM tracking unit 131 determines whether or not the search for similar detected feature points for all of the feature points associated with the tracking object has ended. When the FPM tracking unit 131 determines that the search for a similar detected feature point for all of the feature points associated with the tracking object has ended, the processing transitions to step S307. When the FPM tracking unit 131 determines that the search has not ended, the processing returns to step S304.

In step S307, the FPM tracking unit 131 identifies an area showing an image associated with the tracking object on the basis of the derived similarity for the feature point associated with the tracking object, outputs the center position and size of the area, and then ends the present processing.

Note that in the tracking processing using the feature point matching method executed by the FPM tracking unit 131 according to the present embodiment, a conversion matrix is used in the feature point detection. However, the embodiments of the present invention are not limited thereto. Feature point detection may be executed using another detection method, such as edge detection, corner detection, or the like. Also, instead of deriving the feature amount on the basis of the luminance value as described above, the feature amount may be derived on the basis of the hue or color saturation.

Tracking Unit Switching Control

In this manner, in the image capturing apparatus 100 according to the present embodiment, the tracking unit 130 is provided with the FPM tracking unit 131 and the TM tracking unit 132, and which tracking unit is used in the tracking processing can be switched by the tracking control unit 126. However, the different matching methods give rise to a difference in the accuracy (how much the appropriate object can be continuously tracked) of the tracking processing executed by the FPM tracking unit 131 and the TM tracking unit 132. Specifically, the tracking processing executed by the tracking units use different matching methods and thus have different situations for suitable accuracy. Also, the tracking processing executed by the FPM tracking unit 131 and the tracking processing executed by the TM tracking unit 132 include different calculation processing and thus different power consumption. Accordingly, the tracking control unit 126 preferably executes control to switch the tracking unit executing tracking processing depending on the situation, such as the state of the object, image capture situation, and the like.

In the present embodiment, one mode for switching tracking units includes using different tracking units to execute the tracking processing depending on the type of the tracking object. This mode will now be described.

As described above, an object is tracked across a plurality of captured images sequentially acquired over time. Thus, to obtain a stable tracking result, a tracking unit needs to be selected, expecting the changes over time that shows in the images of the tracking object.

For example, when the tracking object is a dog, cat, bird, or other animal, the orientation and body position of the object is likely to change from moment to moment. Thus, in the template matching executed in the tracking processing on the basis of the feature amount representing the template image, there is a possibility that a suitable tracking result is not obtained. In other words, for an object of this type, there is a possibility that an image of a different shape to the image shown in the template image is shown in different frames. Accordingly, with template matching, a reduction in tracking processing accuracy may occur. On the other hand, the feature point matching method executes tracking of an image of an object on the basis of a distribution such as the brightness around a feature point. Thus, even when the shape in images of the object change over time, because a feature such as the design, pattern, or the like shown on the appearance continuously appears in the captured images, the feature point matching method is better in terms of tracking processing accuracy. In a similar manner, when the tracking object is the full or half body of a person in a sports scene or the like, changes in the orientation or body position of the object can be expected. Thus, the tracking processing of the feature point matching method may have increased accuracy.

Alternatively, when the tracking object is a rigid body unlikely to change in appearance by action, such as a train or vehicle, for example, the changes in shape in the images as with an animal are unlikely. Also, when the tracking object is the face or pupil of a person or the like, there is unlikely to be changes in shape in the images like those of a full or half body. Further, when an object of this type has little texture and a feature point is not detected in an image of the object, it is unlikely that a tracking result of good accuracy can be obtained via the feature point matching method. Accordingly, when the tracking object is one of these types of objects, tracking processing using the template matching method based on a registered template image can be used to obtain a tracking result of good accuracy.

In this manner, this tendency to have or not have change in the shape of the image shown in the captured images can be classified by the type of the tracking object. Accordingly, the tracking control unit 126 according to the present embodiment switches the operation of the tracking unit 130 to use the FPM tracking unit 131 to execute the tracking processing when the type of the tracking object is a type that is expected to have change in the shape of the image in sequentially obtained captured images. Also, the tracking control unit 126 switches the operation of the tracking unit 130 to use the TM tracking unit 132 to execute the tracking processing when the tracking object is another type. For example, the tracking control unit 126 according to the present embodiment switches the tracking unit 130 as illustrated in FIG. 5. In the illustrated example, when the tracking object is a dog, cat, bird, or the full body of a person, the operation of the tracking unit 130 is controlled to use the FPM tracking unit 131 using the feature point matching method. When the tracking object is a train, vehicle, or the face or pupil of a person, the operation of the tracking unit 130 is controlled to use the TM tracking unit 132 using the template matching method. Note that the embodiments of the present invention are not limited to the mode illustrated in FIG. 5, and, naturally, which tracking unit of which matching method to use in the tracking processing can be set for other types.

Tracking Control Processing

Figure 6:
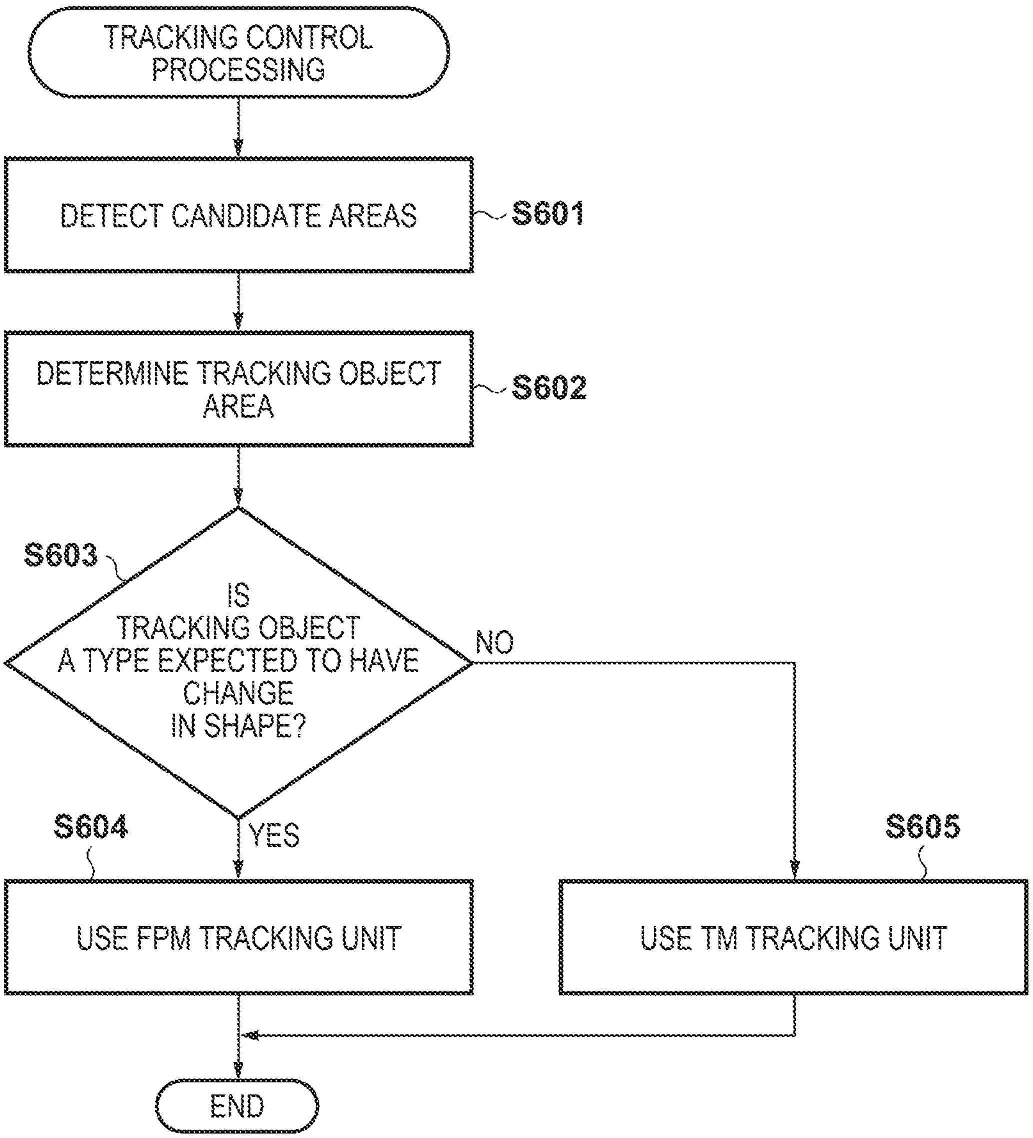
FIG. 6 is a flowchart illustrating an example of tracking control processing executed by the image capturing apparatus 100 according to the first embodiment of the present invention.

The tracking control processing executed by the image processing unit 110 according to the present embodiment will be described below in detail using the flowchart in FIG. 6. The processing corresponding to the flowchart can be implemented by the system control unit 105 causing the image processing unit 110 to operate by reading out the corresponding processing programs stored in the non-volatile memory 106, for example, loading the processing programs on the system memory 107, and executing the processing programs. The present tracking control processing described below is started when the settings of the image capturing apparatus 100 are switched to a mode for image capture while tracking an object, for example.

In step S601, the object detection unit 124 detects candidate areas for the image data for tracking and configures and outputs object information for each candidate area.

In step S602, the target determination unit 125 determines, as a tracking object area, one candidate area from the detected candidate areas on the basis of the object information output in step S601.

In step S603, the tracking control unit 126 determines whether or not the type of the tracking object is a type expected to have change in the shape of the image on the basis of the object information associated with the determined tracking object area. When the tracking control unit 126 determines that the type of the tracking object is a type expected to have change in the shape of the image, the processing transitions to step S604. When the tracking control unit 126 determines otherwise, the processing transitions to step S605.

In step S604, the tracking control unit 126 controls the tracking unit 130 to execute the tracking processing using the FPM tracking unit 131 for the subsequent frames.

On the other hand, when the type of the tracking object is determined to not be a type expected to have change in the shape of the image in step S603, the tracking control unit 126 in step S605 controls the tracking unit 130 to execute the tracking processing using the TM tracking unit 132 for the subsequent frames.

In this manner, the operation of the tracking unit 130 can be switched so that the tracking processing using the matching method suitable to the movement characteristics of the tracking object is executed. This allows a tracking result of suitable accuracy to be obtained.

Note that in the present embodiment described above, the operation of the tracking unit 130 executes control on the basis of the type of the tracking object determined by the target determination unit 125. However, the embodiments of the present invention are not limited thereto. For example, in a mode in which the type of the object to be tracked is provided for each image capture mode set in the image capturing apparatus 100, irrespective of the type of the tracking object associated with the tracking object area determined from among the candidate areas, the tracking unit 130 may be controlled according to the type prioritized in the mode. Here, a priority level may be given to the type prioritized by the mode and the types of the tracking objects included in the images in the actual captured images, and the operation of the tracking unit 130 may be controlled adaptively depending on the state of the tracking object.

Second Embodiment

In the embodiment described above, the tracking processing executed using either the FPM tracking unit 131 or the TM tracking unit 132 is switched to depending on the type of the tracking object. However, the embodiments of the present invention are not limited thereto. In the present embodiment described below, the operation of the tracking unit 130 is switched depending on the size of the tracking object area.

The size of the tracking object area proportional to the captured image may be dependent on the distance between the tracking object and the image capturing apparatus 100. In other words, the same object may appear large in the captured image when close to the image capturing apparatus 100, but appear small in the captured image when far away from the image capturing apparatus 100. Accordingly, how much an image of a tracking object that moves or changes orientation changes in shape is more pronounced when the object is close to the image capturing apparatus 100 compared to when the object is far from the image capturing apparatus 100. In other words, regarding a tracking object area that is a relatively small size in the captured image, the change in the state of the tracking object causes little effect on the change in the shape of the image. Thus, the tracking processing using the template matching method can be used to suitable execute tracking independent of the presence of a feature point. On the other hand, regarding a tracking object area that is a relatively large size in the captured image, the change in the state of the corresponding tracking object causes an unignorable effect on the change in the shape of the image. Thus, the tracking processing using the feature point matching method can be used to execute more suitable tracking. Thus, in the image capturing apparatus 100 according to the present embodiment, the tracking control unit 126 switches the operation of the tracking unit 130 depending on the size of the tracking object area.

Tracking Control Processing

Figure 7:
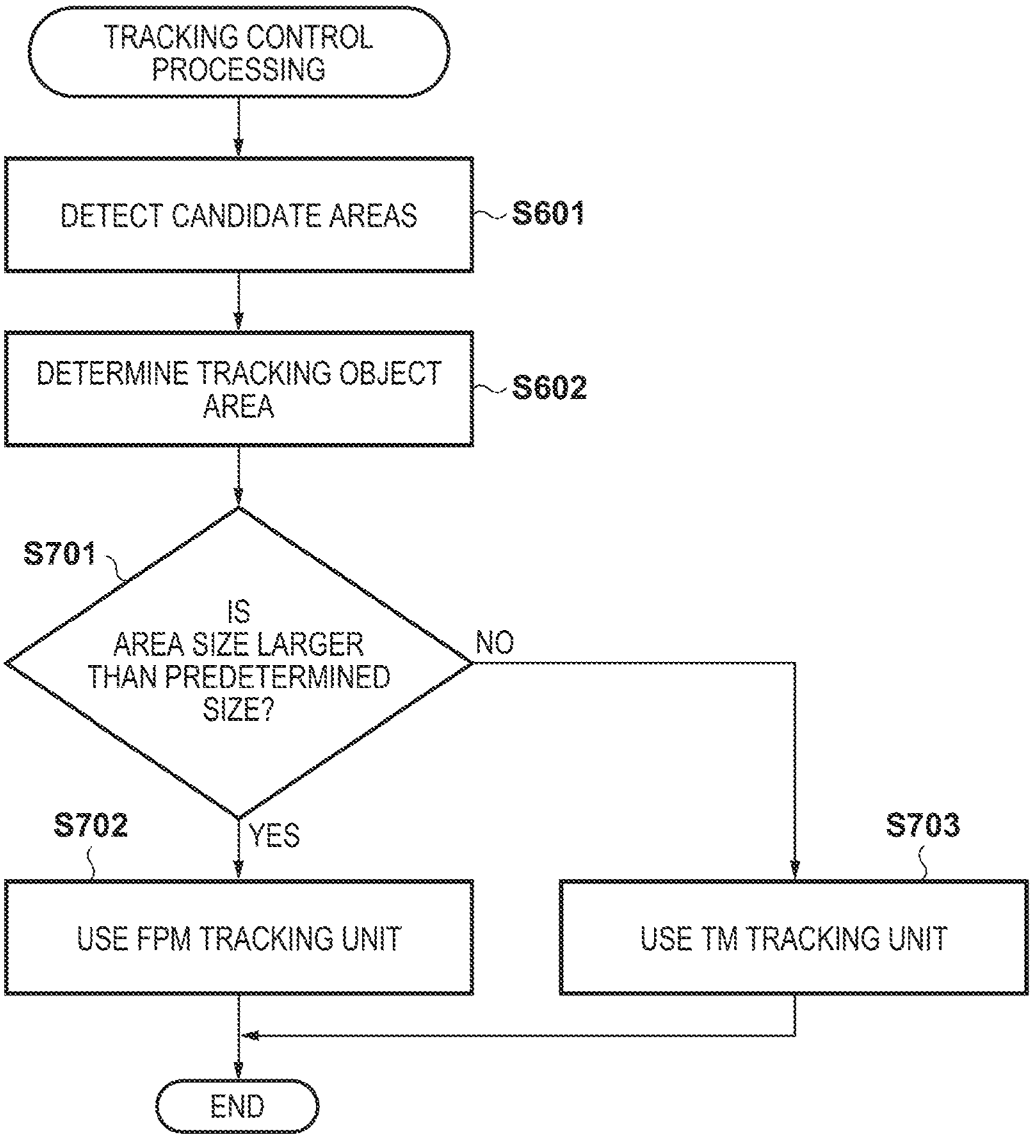
FIG. 7 is a flowchart illustrating an example of tracking control processing executed by the image capturing apparatus 100 according to a second embodiment of the present invention.

The tracking control processing executed by the image processing unit 110 according to the present embodiment will be described below in detail using the flowchart in FIG. 7. The processing corresponding to the flowchart can be implemented by the system control unit 105 causing the image processing unit 110 to operate by reading out the corresponding processing programs stored in the non-volatile memory 106, for example, loading the processing programs on the system memory 107, and executing the processing programs. The present tracking control processing described below is started when the settings of the image capturing apparatus 100 are switched to a mode for image capture while tracking an object, for example. Note that for the tracking control processing according to the present embodiment, the processes for executing processing similar to the tracking control processing of the first embodiment are given the same reference number and description thereof is omitted. Only the process for executing processing distinctive to the present embodiment will be described below.

When the tracking object area is determined in step S602, in step S701, the tracking control unit 126 determines whether or not the size of the tracking object area is greater than a predetermined size. Here, the predetermined size is a fixed value and may be set as a constant value with respect to the size of the captured image or may be set for each type of tracking object. When the tracking control unit 126 determines that the size of the tracking object area is greater than the predetermined size, the processing transitions to step S702. When the tracking control unit 126 determines that the size of the tracking object area is not greater (smaller) than the predetermined size, the processing transitions to step S703.

In step S702, the tracking control unit 126 controls the tracking unit 130 to execute the tracking processing using the FPM tracking unit 131 for the subsequent frames.

On the other hand, when the size of the tracking object area is determined to be not greater than the predetermined size in step S701, the tracking control unit 126 in step S703 controls the tracking unit 130 to execute the tracking processing using the TM tracking unit 132 for the subsequent frames.

In this manner, the operation of the tracking unit 130 can be switched so that the tracking processing using the matching method suitable to the amount of change in the image caused by movement of the tracking object is executed. This allows a tracking result of suitable accuracy to be obtained.

Note that in the present embodiment described above, the operation of the tracking unit 130 executes control on the basis of the size of the tracking object determined by the target determination unit 125. However, the embodiments of the present invention are not limited thereto. For example, in a mode in which the expected size of the object to be tracked is set for each image capture mode set in the image capturing apparatus 100, irrespective of the size of the tracking object area determined from among the candidate areas, the tracking unit 130 may be controlled according to the size prioritized in the mode. Here, a priority level may be given to the size expected by the mode and the sizes of the tracking object areas included in the actual captured images, and the operation of the tracking unit 130 may be controlled adaptively depending on the state of the tracking object.

Third Embodiment

In the embodiments described above, the tracking processing executed using either the FPM tracking unit 131 or the TM tracking unit 132 is switched to depending on the type of the tracking object or the size of the tracking object area. However, the embodiments of the present invention are not limited thereto. In the present embodiment described below, the operation of the tracking unit 130 is switched depending on the movement amount of the tracking object.

Here, movement amount of the object is an evaluation value obtained by quantifying the amount and the intensity of the movement of the object. In the image capturing apparatus 100 according to the present embodiment, the movement amount is derived by the evaluation value generation unit 108. Specifically, the evaluation value generation unit 108 uses two or more pieces of image data including image data corresponding to a reference to derive motion vector information (optical flow) from the image data corresponding to the reference and ultimately derive the movement amount as an evaluation value. The movement amount of the object is a derived value that is small in the case of a static object and large in the case of a dynamic object corresponding to the amount of movement and speed.

When the movement amount of the tracking object is greater, it is expected that not only the shape of the object area changes but that the appearance will change with the object being partially blocked when moving behind other objects, the object blocking the background, and the like. In other words, when the movement amount of the tracking object is greater, the image of the tracking object in other frames is likely to not appear with a stable appearance. In such cases, with the template matching method, the accuracy of the tracking processing of the image of the tracking object may be reduced, making executing the tracking processing using the feature point matching method preferable. When the movement amount of the tracking object is small, it is expected that the image of the tracking object has a stable appearance in the captured images of the other frames. Thus, tracking can be executed that is independent of the presence of a feature point via the tracking processing using the template matching method. Thus, in the image capturing apparatus 100 according to the present embodiment, the tracking control unit 126 switches the operation of the tracking unit 130 depending on the movement amount of the tracking object.

Tracking Control Processing

Figure 8:
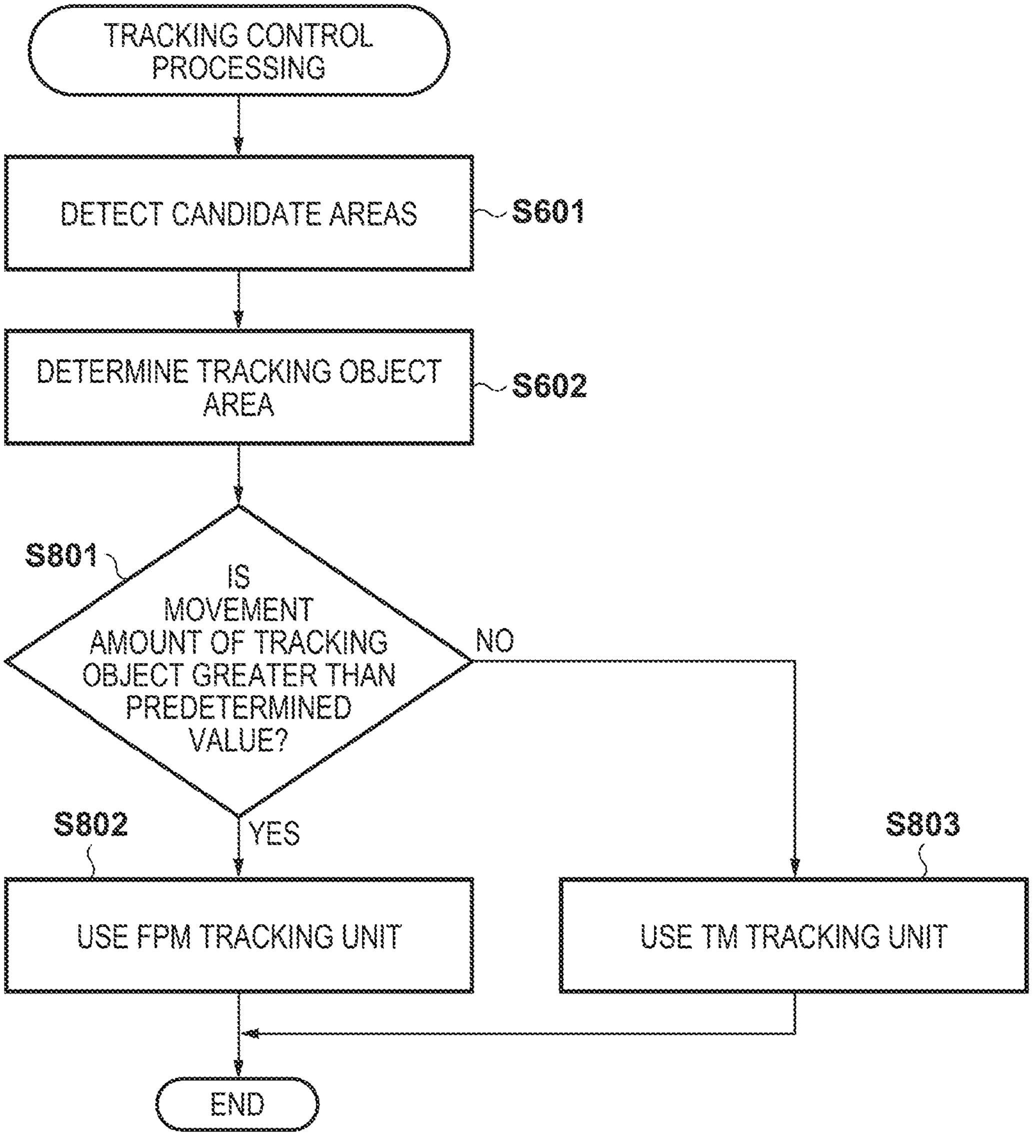
FIG. 8 is a flowchart illustrating an example of tracking control processing executed by the image capturing apparatus 100 according to a third embodiment of the present invention.

The tracking control processing executed by the image processing unit 110 according to the present embodiment will be described below in detail using the flowchart in FIG. 8. The processing corresponding to the flowchart can be implemented by the system control unit 105 causing the image processing unit 110 to operate by reading out the corresponding processing programs stored in the non-volatile memory 106, for example, loading the processing programs on the system memory 107, and executing the processing programs. The present tracking control processing described below is started when the settings of the image capturing apparatus 100 are switched to a mode for image capture while tracking an object, for example. Note that for the tracking control processing according to the present embodiment, the processes for executing processing similar to the tracking control processing of the first embodiment are given the same reference number and description thereof is omitted. Only the process for executing processing distinctive to the present embodiment will be described below.

When the tracking object area is determined in step S602, in step S801, the tracking control unit 126 determines whether or not the movement amount of the tracking object is greater than a predetermined value. Here, the predetermined value may be a fixed value or may be set for each type of tracking object. When the tracking control unit 126 determines that the movement amount of the tracking object area is greater than the predetermined value, the processing transitions to step S802. When the tracking control unit 126 determines that the movement amount is less than the predetermined value, the processing transitions to step S803.

In step S802, the tracking control unit 126 controls the tracking unit 130 to execute the tracking processing using the FPM tracking unit 131 for the subsequent frames.

On the other hand, when the movement amount of the tracking object is determined to be not greater than the predetermined value in step S801, the tracking control unit 126 in step S803 controls the tracking unit 130 to execute the tracking processing using the TM tracking unit 132 for the subsequent frames.

In this manner, whether the image of the tracking object will appear stable in the captured images is inferred on the basis of the movement amount of the tracking object, and the matching method of the tracking processing can be switched appropriately. This allows a tracking result of suitable accuracy to be obtained.

Fourth Embodiment

In the embodiments described above, the tracking processing executed using either the FPM tracking unit 131 or the TM tracking unit 132 is switched to on the basis of information indicating the state of the tracking object shown in the captured images. However, the embodiments of the present invention are not limited thereto. In the present embodiment described below, the operation of the tracking unit 130 is switched depending on the autofocus (hereinafter referred to as AF) mode set for the image capturing apparatus 100 when capturing the captured images and not a feature shown in the captured images.

The AF modes include various types of modes with different focus operation frequency and operation, such as single AF mode, continuous AF mode, and the like. Here, single AF mode is an AF mode in which a focus operation is executed one time at the time the SW1 signal associated with a half press of the release button is received and the focal length is fixed thereafter. Continuous AF mode is an AF mode in which focus operation is repeatedly executed during the image capture period and the focal length is dynamically updated to match a specified object.

These AF modes are selected depending on the object the user wishes to capture an image of Specifically, considering the focus characteristics, the single AF mode is suited to image capture of a stationary object, and the continuous AF mode is suited to image capture of an object with a continuously changing (moving) image capture distance. Accordingly, the behavior (state) of the tracking object can be inferred from the AF mode setting. In other words, when the continuous AF mode is set, the shape of the image of the tracking object shown in the captured images is expected to change due to the movement of the tracking object. Thus, the tracking processing using the feature point matching method is preferably executed due to its advantages in cases of changing shapes. When the single AF mode is set, it is expected that the tracking object moves little and the image of the tracking object has a stable appearance in the captured images. Thus, tracking can be executed that is independent of the presence of a feature point via the tracking processing using the template matching method. Thus, in the image capturing apparatus 100 according to the present embodiment, the tracking control unit 126 switches the operation of the tracking unit 130 depending on the AF mode set for the image capturing apparatus 100.

Tracking Control Processing

Figure 9:
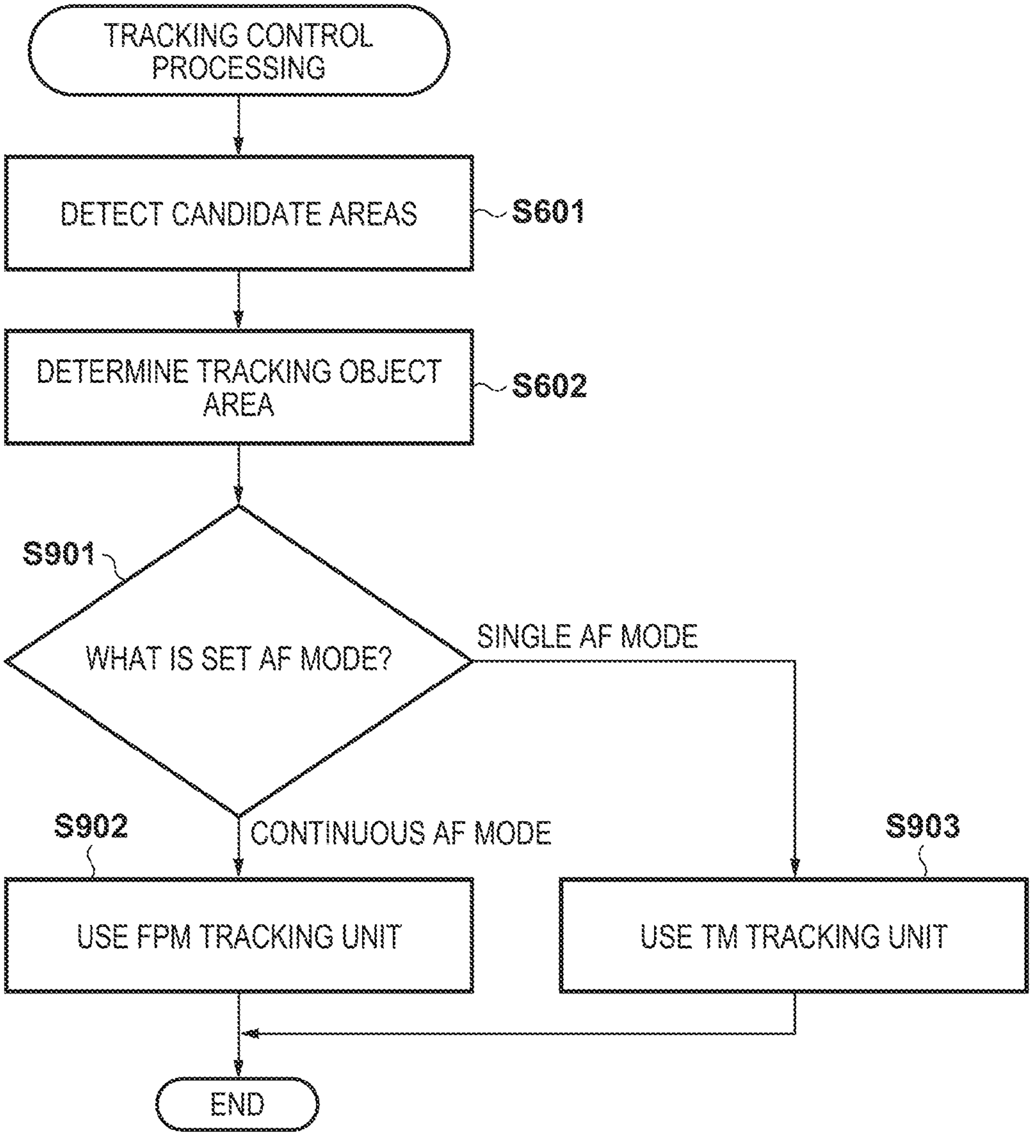
FIG. 9 is a flowchart illustrating an example of tracking control processing executed by the image capturing apparatus 100 according to a fourth embodiment of the present invention.

The tracking control processing executed by the image processing unit 110 according to the present embodiment will be described below in detail using the flowchart in FIG. 9. The processing corresponding to the flowchart can be implemented by the system control unit 105 causing the image processing unit 110 to operate by reading out the corresponding processing programs stored in the non-volatile memory 106, for example, loading the processing programs on the system memory 107, and executing the processing programs. The present tracking control processing described below is started when the settings of the image capturing apparatus 100 are switched to a mode for image capture while tracking an object, for example. Note that for the tracking control processing according to the present embodiment, the processes for executing processing similar to the tracking control processing of the first embodiment are given the same reference number and description thereof is omitted. Only the process for executing processing distinctive to the present embodiment will be described below.

When the tracking object area is determined in step S602, in step S901, the tracking control unit 126 determines whether or not the AF mode set for the image capturing apparatus 100 is the continuous AF mode or the single AF mode. When the tracking control unit 126 determines that the set AF mode is the continuous AF mode, the processing transitions to step S902. When the tracking control unit 126 determines that the AF mode is the single AF mode, the processing transitions to step S903.

In step S902, the tracking control unit 126 controls the tracking unit 130 to execute the tracking processing using the FPM tracking unit 131 for the subsequent frames.

On the other hand, when it is determined that the set AF mode is the single AF mode in step S901, the tracking control unit 126 in step S903 controls the tracking unit 130 to execute the tracking processing using the TM tracking unit 132 for the subsequent frames.

In this manner, the state of the tracking object can be inferred on the basis of the AF mode set for the image capturing apparatus 100, and the matching method of the tracking processing can be appropriately switched. This allows a tracking result of suitable accuracy to be obtained.

Fifth Embodiment

In the fourth embodiment described above, the state of the tracking object is inferred on the basis of the AF mode set for the image capturing apparatus 100, and the tracking processing executed using either the FPM tracking unit 131 or the TM tracking unit 132 is switched to. However, the embodiments of the present invention are not limited thereto. In the present embodiment described below, the operation of the tracking unit 130 is switched depending on the shutter speed used to capture the captured images.

When the exposure time of the image sensor 104 is long, the position where the optical image of a moving object is formed may change during exposure, resulting in a blurred image of the object (object blur) in the obtained captured images. On the other hand, when the exposure time is short, even with a moving object, there is a low possibility of the image of the object being blurred in the obtained captured images. In other words, in the case of a blurred image of the object, a feature point of the object cannot be suitably detected, meaning that the tracking processing using the feature point matching method is likely to be unsuitable. Accordingly, when the shutter speed is a low speed, the tracking processing using the template matching method can be used to avoid a reduction in the accuracy of the tracking result. Alternatively, when the shutter speed is a fast speed, the image of the object in a non-blurred state is included in the captured images, meaning that the tracking processing using the feature point matching method can be used to obtain a more suitable and accurate tracking result. Thus, in the image capturing apparatus 100 according to the present embodiment, the tracking control unit 126 switches the operation of the tracking unit 130 depending on the shutter speed used to capture the captured images.

Tracking Control Processing

Figure 10:
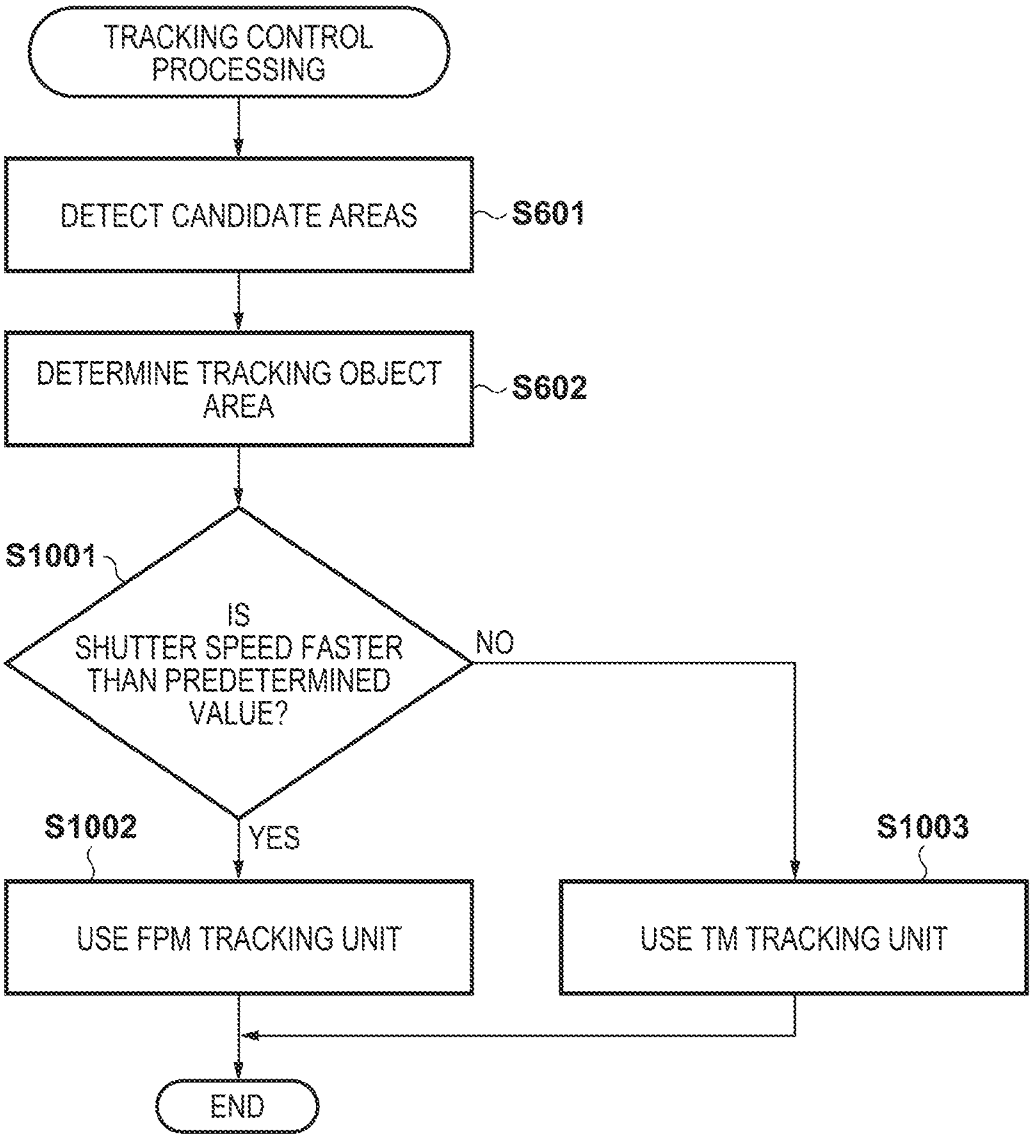
FIG. 10 is a flowchart illustrating an example of tracking control processing executed by the image capturing apparatus 100 according to a fifth embodiment of the present invention.

The tracking control processing executed by the image processing unit 110 according to the present embodiment will be described below in detail using the flowchart in FIG. 10. The processing corresponding to the flowchart can be implemented by the system control unit 105 causing the image processing unit 110 to operate by reading out the corresponding processing programs stored in the non-volatile memory 106, for example, loading the processing programs on the system memory 107, and executing the processing programs. The present tracking control processing described below is started when the settings of the image capturing apparatus 100 are switched to a mode for image capture while tracking an object, for example. Note that for the tracking control processing according to the present embodiment, the processes for executing processing similar to the tracking control processing of the first embodiment are given the same reference number and description thereof is omitted. Only the process for executing processing distinctive to the present embodiment will be described below.

When the tracking object area is determined in step S602, in step S1001, the tracking control unit 126 determines whether or not the shutter speed set for the image capturing apparatus 100 when capturing the captured images is faster than a predetermined value. When the tracking control unit 126 determines that the shutter speed is faster than the predetermined value, the processing transitions to step S1002. When the tracking control unit 126 determines that the shutter speed is not faster (is slower) than the predetermined value, the processing transitions to step S1003.

In step S1002, the tracking control unit 126 controls the tracking unit 130 to execute the tracking processing using the FPM tracking unit 131 for the subsequent frames.

On the other hand, when the shutter speed is determined to be not faster than the predetermined value in step S1001, the tracking control unit 126 in step S1003 controls the tracking unit 130 to execute the tracking processing using the TM tracking unit 132 for the subsequent frames.

In this manner, the matching method can be switched on the basis of whether the captured images are suitable for the feature point matching method on the basis of the shutter speed set for the image capturing apparatus 100 when capturing images. This allows a tracking result of suitable accuracy to be obtained.

First Modification

In the first to fifth embodiment described above, execution of the tracking processing is switched to the FPM tracking unit 131 for cases in which the feature point matching method is preferable and switched to the TM tracking unit 132 for other cases. However, the embodiments of the present invention are not limited thereto. For cases in which the feature point matching method is not preferable, another discretionary matching method, not only the template matching method, may be used to execute the tracking processing. In one mode, such a case may use a matching method using a machine learning model to execute the tracking processing.

Sixth Embodiment

In the embodiments described above, the preferable situation for executing the tracking processing using the feature point matching method is identified on the basis of situation information, and the TM tracking unit 132 executes the tracking processing using the template matching method in other situations. However, situations in which the template matching method is preferably used also exist. In the present embodiment described below, the preferable situation for executing the tracking processing using the template matching method is identified on the basis of situation information, and the operation of the tracking unit 130 is switched on the basis of this result.

For example, in the case of taking a group photo or the case of capturing images of a game of a team sport, many images of similar objects may be included in the captured images. In this case, in the tracking processing using the feature point matching method, there is a possibility of the image of another similar object being erroneously tracked. Thus, using the template matching method with high robustness is preferable. Alternatively, when the number of objects (number of object candidates) is low, the possibility of erroneous tracking is low. Thus, the tracking processing using the feature point matching method is more suitable for executing the tracking processing with few feature points. Thus, in the image capturing apparatus 100 according to the present embodiment, the tracking control unit 126 switches the operation of the tracking unit 130 depending on the number of objects included in the captured images.

Tracking Control Processing

Figure 11:
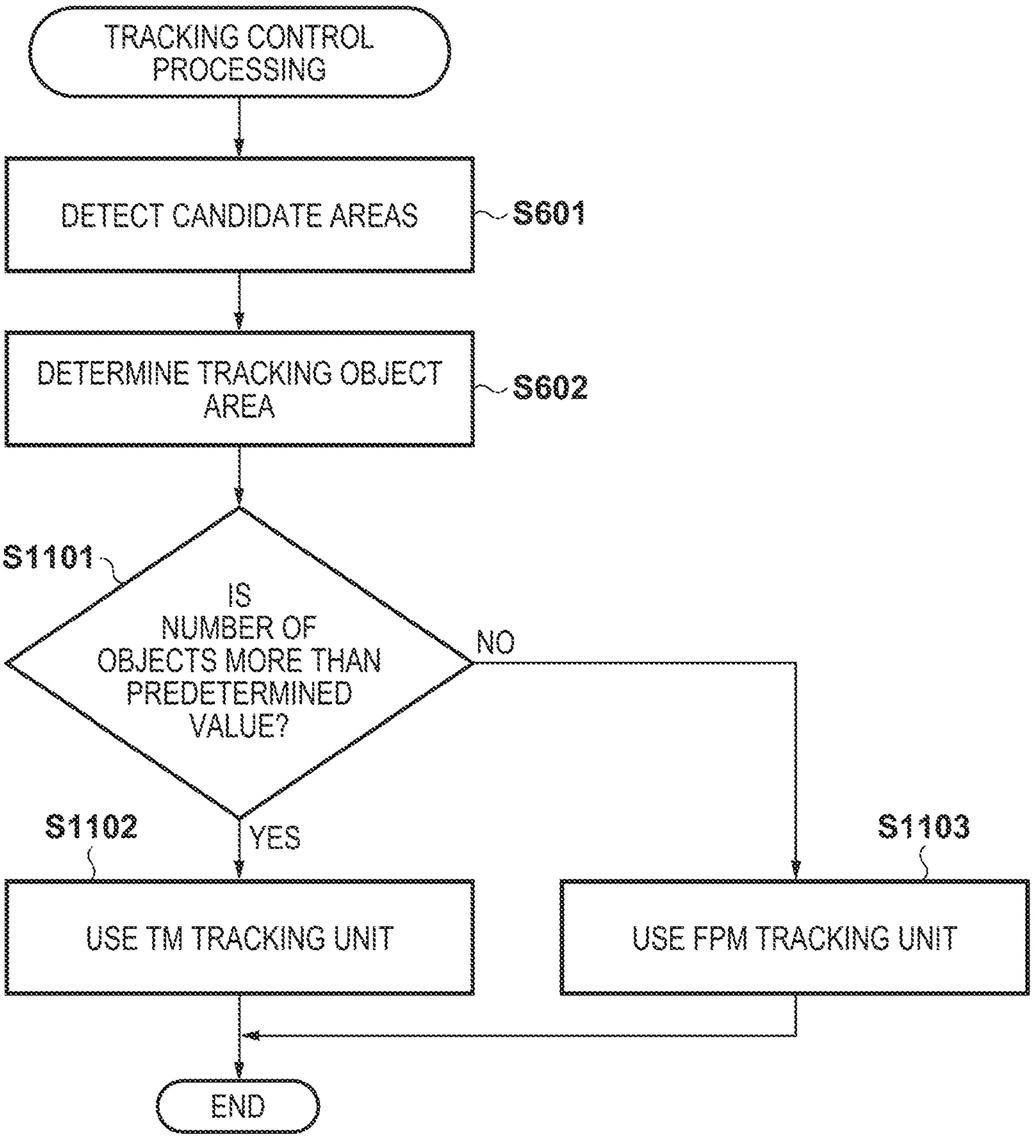
FIG. 11 is a flowchart illustrating an example of tracking control processing executed by the image capturing apparatus 100 according to a sixth embodiment of the present invention.

The tracking control processing executed by the image processing unit 110 according to the present embodiment will be described below in detail using the flowchart in FIG. 11. The processing corresponding to the flowchart can be implemented by the system control unit 105 causing the image processing unit 110 to operate by reading out the corresponding processing programs stored in the non-volatile memory 106, for example, loading the processing programs on the system memory 107, and executing the processing programs. The present tracking control processing described below is started when the settings of the image capturing apparatus 100 are switched to a mode for image capture while tracking an object, for example. Note that for the tracking control processing according to the present embodiment, the processes for executing processing similar to the tracking control processing of the first embodiment are given the same reference number and description thereof is omitted. Only the process for executing processing distinctive to the present embodiment will be described below.

When the tracking object area is determined in step S602, in step S1101, the tracking control unit 126 determines whether or not the number of objects included in the captured images is greater than the predetermined value. Here, the predetermined value associated with the number of objects may be preset for the set image capture mode or may be set for each type of tracking object. When the tracking control unit 126 determines that the number of objects is greater than the predetermined value, the processing transitions to step S1102. When the tracking control unit 126 determines that the number of objects is not greater (is less) than the predetermined value, the processing transitions to step S1103.

In step S1102, the tracking control unit 126 controls the tracking unit 130 to execute the tracking processing using the TM tracking unit 132 for the subsequent frames.

On the other hand, when the number of objects included in the captured images is determined to be not greater than the predetermined value in step S1101, the tracking control unit 126 in step S1103 controls the tracking unit 130 to execute the tracking processing using the FPM tracking unit 131 for the subsequent frames.

In this manner, the tracking processing using the matching method with a higher robustness can be switched to depending on the number of images of objects distributed in the captured images. This allows a tracking result of suitable accuracy to be obtained.

Note that in the present embodiment described above, the operation of the tracking unit 130 is switched simply on the basis of the number of objects. However, the embodiments of the present invention are not limited thereto. The tracking control unit 126 may switch the operation of the tracking unit 130 on the basis of the number of objects of the same type or similar type to the tracking object included in the captured images, for example.

Seventh Embodiment

In the embodiments and modification described above, the operation of the tracking unit 130 is switched in order to improve the accuracy of the tracking result. However, the embodiments of the present invention are not limited thereto. For example, in a situation in which image data for tracking cannot be acquired via a suitable mode for the tracking processing, such as when the captured images are not light or the like, even by executing the tracking processing, an improvement in the accuracy of the tracking result can not be expected. In such image capture situations, because a suitable tracking result is difficult to obtain in the first place, there is little importance in improving the accuracy of the tracking result. Accordingly, if the tracking processing is executed, the matching method with the lower power consumption is preferably used. The amount of information to be processed when searching is different for the feature point matching method and the template matching method. Thus, the tracking processing using the former method results in lower power consumption. Thus, in the image capturing apparatus 100 according to the present embodiment, the tracking control unit 126 switches the operation of the tracking unit 130 depending on the brightness of the image capture environment.

Tracking Control Processing

Figure 12:
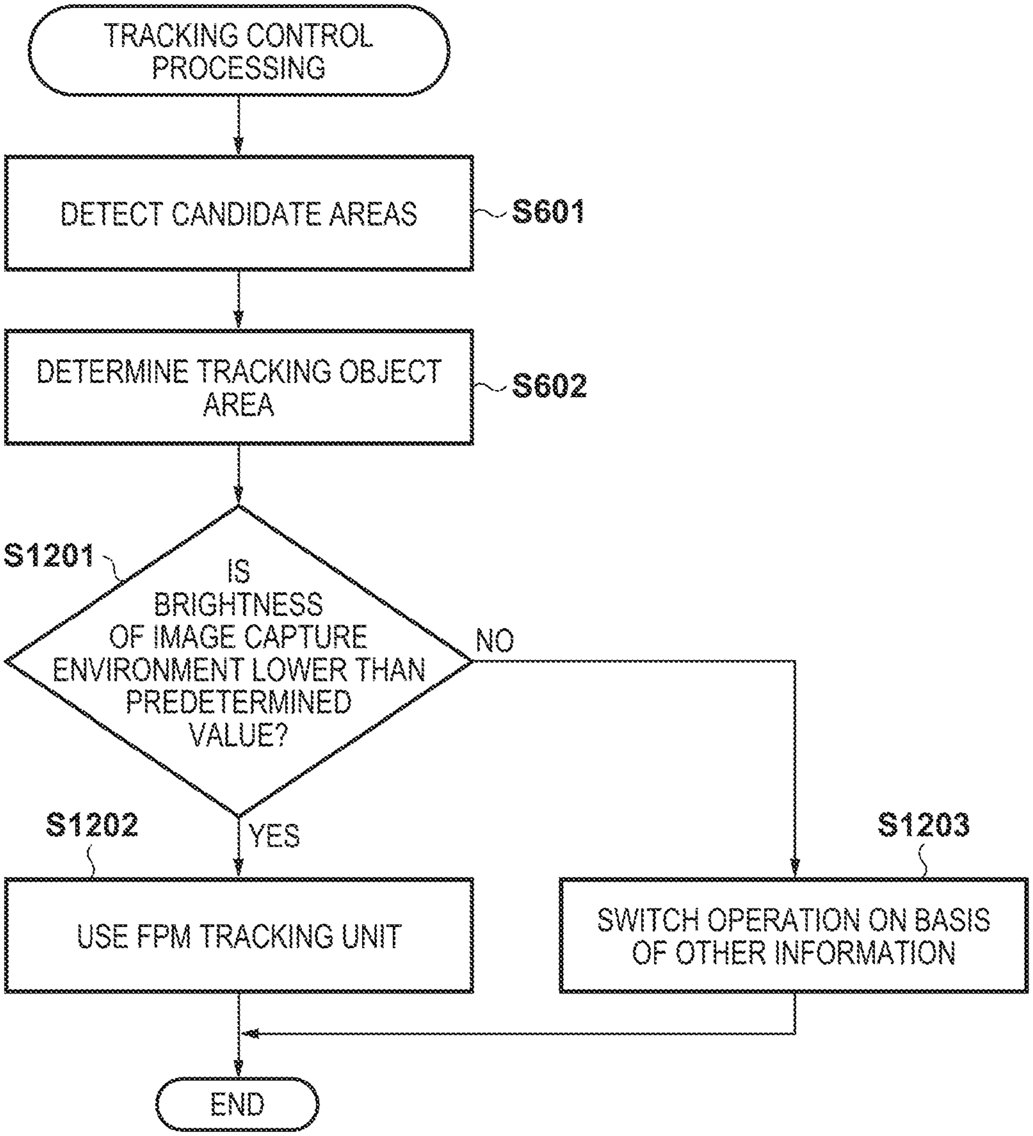
FIG. 12 is a flowchart illustrating an example of tracking control processing executed by the image capturing apparatus 100 according to a second modification of the present invention.

The tracking control processing executed by the image processing unit 110 according to the present embodiment will be described below in detail using the flowchart in FIG. 12. The processing corresponding to the flowchart can be implemented by the system control unit 105 causing the image processing unit 110 to operate by reading out the corresponding processing programs stored in the non-volatile memory 106, for example, loading the processing programs on the system memory 107, and executing the processing programs. The present tracking control processing described below is started when the settings of the image capturing apparatus 100 are switched to a mode for image capture while tracking an object, for example. Note that for the tracking control processing according to the present embodiment, the processes for executing processing similar to the tracking control processing of the first embodiment are given the same reference number and description thereof is omitted. Only the process for executing processing distinctive to the present embodiment will be described below.

When the tracking object area is determined in step S602, in step S1201, the tracking control unit 126 determines whether or not the brightness of the image capture environment shown in the captured images is less than a predetermined value. Here, the brightness of the image capture environment may be acquired on the basis of the brightness information output from the evaluation value generation unit 108. Also, the brightness of the image capture environment may be acquired from the brightness information corresponding to the captured image of one frame or may be derived from the brightness information corresponding to the captured images of a plurality of frames. When the tracking control unit 126 determines that the brightness of the image capture environment is less than the predetermined value, the processing transitions to step S1202. When the tracking control unit 126 determines that the brightness of the image capture environment is not less (is greater) than the predetermined value, the processing transitions to step S1203.

In step S1202, the tracking control unit 126 controls the tracking unit 130 to execute the tracking processing using the FPM tracking unit 131 for the subsequent frames.

On the other hand, when the brightness of the image capture environment is determined to be not less than the predetermined value in step S1201, the tracking control unit 126 in step S1203 determines whether to cause the FPM tracking unit 131 or the TM tracking unit 132 to execute the tracking processing for the subsequent frames. Then, the tracking control unit 126 switches the operation of the tracking unit 130 on the basis of the determination. Here, the determination in the present process may be executed by determination similar to the switching control according to at least one of the tracking control processing according to the embodiments described above, for example.

In this manner, the matching method can be switched on the basis of the determination of whether or not improving the accuracy of the tracking processing is important on the basis of the brightness of the image capture environment. This allows the run duration of the image capturing apparatus 100 to be increased while also capturing images using the object tracking function.

Second Modification

In the embodiments and the modification described above, tracking control processing is executed to switch to executing the tracking processing using either the FPM tracking unit 131 or the TM tracking unit 132. However, executing the tracking processing can be considered to have low necessity when the user moves the image capturing apparatus 100 to keep a moving object at the same position in the field of view, that is when so-called panning shooting is performed. In other words, in the case of panning shooting, the situation can be determined to not require the object tracking function. In this situation, since it is unnecessary for the tracking unit 130 to execute the tracking processing in the first place, when the tracking control unit 126 detects that panning shooting is being performed, the tracking control unit 126 can control the tracking unit 130 to not execute the tracking processing.

Here, detecting that panning shooting is being performed can be a determination on the basis of the output (movement information) from a motion sensor 151 indicated by a dashed line in FIG. 1, for example. The motion sensor 151 may be an acceleration sensor or an angular velocity sensor, for example. In the illustrated example, the motion sensor 151 is a built-in component of the image capturing apparatus 100. However, the motion sensor 151 may be a built-in component of an interchangeable-lens in the case of an image capturing apparatus with an interchangeable lens. The movement information output from the motion sensor 151 may be input to the image processing unit 110 as one mode of situation information. Also, when the movement information indicates that the image capturing apparatus 100 is moving in a constant direction, the tracking control unit 126 may determine that panning shooting is being performed. Alternatively, in another mode, that panning shooting is being performed may be detected simply on the basis of whether or not a panning shooting image capture mode is set.

In this manner, unnecessary execution of the tracking processing can be avoided, and an object tracking function with further reduced power consumption can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus for tracking an image of a predetermined object included in an input captured image, the image processing apparatus comprising:

(a) at least one memory storing a computer program and at least one processor executing the computer program and/or (b) at least one circuit, that function as a plurality of units comprising:

(1) a first acquiring unit configured to acquire the captured image;

(2) a tracking unit configured to execute tracking processing to identify a position of the image of the predetermined object included in the captured image, the tracking unit including a first tracking unit and a second tracking unit configured to execute the tracking processing using different matching methods;

(3) a second acquiring unit configured to acquire situation information indicating a state of the predetermined object and/or an image capture situation of the captured image; and (4) a control unit configured to, on a basis of the situation information, switch to executing the tracking processing using either the first tracking unit or the second tracking unit on a basis of the captured image acquired by the first acquiring unit, wherein the first tracking unit executes the tracking processing using a feature point matching method, wherein the matching method used by the first tracking unit has a lower power consumption associated with executing the tracking processing than the matching method used by the second tracking unit, and wherein the control unit switches to executing the tracking processing using the first tracking unit when a movement amount of the predetermined object is greater than a predetermined value, and switches to executing the tracking processing using the second tracking unit when the movement amount of the predetermined object is less than the predetermined value.

2. The image processing apparatus according to claim 1, wherein the situation information includes information indicating whether or not the captured image is obtained via panning shooting, and wherein the control unit executes control to cause the tracking unit not to execute the tracking processing when the captured image is obtained via panning shooting.

3. An image capturing apparatus comprising:

an image capture unit configured to output a captured image; and the image processing apparatus according to claim 1.

4. A computer-readable storage medium storing a program configured to cause a computer to function as the image processing apparatus according to claim 1.

5. The image processing apparatus according to claim 1, wherein the situation information indicates the state of the predetermined object.

6. The image processing apparatus according to claim 1, wherein situation information relates to any one or more of (a) a determination that the predetermined object is a dog, (b) a determination that the predetermined object is a cat, (c) a determination that the predetermined object is a bird, (d) a determination that the predetermined object is a train, (e) a determination that the predetermined object is a car, (f) a determination that the predetermined object is a person, (g) a determination that the predetermined object is a face, or (h) a determination that the predetermined object is a pupil.

7. The image processing apparatus according to claim 1, wherein the situation information indicates the image capture situation of the captured image.

8. The image processing apparatus according to claim 1, wherein the situation information relates to any one or more of (a) a determination that the predetermined object is of a type expected to have a change in shape during tracking, (b) a determination that an area of the predetermined object in the captured image is greater than a predetermined size, (c) a determination that a movement amount of the predetermined object is greater than a predetermined value, (d) a determination of an autofocus mode, (e) a determination of whether a shutter speed is greater than a predetermined value, (f) a determination of a number of objects in the captured image being greater than a predetermined value, or (g) a determination that a brightness of an image capture environment is lower than a predetermined value.

9. The image processing apparatus according to claim 1, wherein the matching method used by the first tracking unit and the matching method used by the second tracking unit are both matching methods not using a machine learning model.

10. The image processing apparatus according to claim 1, wherein the situation information includes information indicating a size of the image of the predetermined object in the captured image, and wherein the control unit switches to executing the tracking processing using the first tracking unit when the size of the image of the predetermined object is greater than a predetermined size, and switches to executing the tracking processing using the second tracking unit when the size of the image of the predetermined object is less than the predetermined size.

11. The image processing apparatus according to claim 1, wherein the situation information includes information of an autofocus mode set for an image capturing apparatus used to capture the captured image, and wherein the control unit switches to executing the tracking processing using the first tracking unit when the autofocus mode set for the image capturing apparatus is a mode for dynamically updating a focal length to match a specified object, and switches to executing the tracking processing using the second tracking unit when the autofocus mode set for the image capturing apparatus is a mode with a fixed focal length.

12. The image processing apparatus according to claim 1, wherein the situation information includes information of a shutter speed used to capture the captured image, and wherein the control unit switches to executing the tracking processing using the first tracking unit when the shutter speed used to capture the captured image is faster than a predetermined value, and switches to executing the tracking processing using the second tracking unit when the shutter speed used to capture the captured image is slower than the predetermined value.

13. The image processing apparatus according to claim 1, wherein the situation information includes information of a brightness of an image capture environment associated with the captured image, and wherein the control unit switches to executing the tracking processing using the first tracking unit when the brightness of the image capture environment is less than a predetermined value.

14. The image processing apparatus according to claim 1, wherein the second tracking unit executes the tracking processing using a template matching method.

15. The image processing apparatus according to claim 14, wherein the situation information includes information of a number of objects included in the captured image, and wherein the control unit switches to executing the tracking processing using the second tracking unit when the number of objects included in the captured image is greater than a predetermined value, and switches to executing the tracking processing using the first tracking unit when the number of objects included in the captured image is less than the predetermined value.

16. The image processing apparatus according to claim 1, wherein the situation information includes information indicating a type of the predetermined object, and wherein the control unit switches to executing the tracking processing using the first tracking unit when the type of the predetermined object is a first type, and switches to executing the tracking processing using the second tracking unit when the type of the predetermined object is a second type different from the first type.

17. The image processing apparatus according to claim 16, wherein the first type is a type for classifying an object expected to have a change in shape of the image of the predetermined object during tracking.

18. A control method for an image processing apparatus for tracking an image of a predetermined object included in an input captured image, the image processing apparatus functioning as a tracking unit configured to execute tracking processing to identify a position of the image of the predetermined object included in the captured image, the tracking unit including a first tracking unit and a second tracking unit configured to execute the tracking processing using different matching methods, the control method comprising:

acquiring the captured image;

acquiring situation information indicating a state of the predetermined object and/or an image capture situation of the captured image; and on a basis of the situation information, switching to executing the tracking processing using either the first tracking unit or the second tracking unit on a basis of the captured image, wherein the first tracking unit executes the tracking processing using a feature point matching method, wherein the matching method used by the first tracking unit has a lower power consumption associated with executing the tracking processing than the matching method used by the second tracking unit, and wherein in the switching, (1) the tracking processing is switched to the first tracking unit when a movement amount of the predetermined object is greater than a predetermined value, and (2) the tracking processing is switched to the second tracking unit when the movement amount of the predetermined object is less than the predetermined value.

19. An image processing apparatus for tracking an image of a predetermined object included in an input captured image, the image processing apparatus comprising:

(a) at least one memory storing a computer program and at least one processor executing the computer program and/or (b) at least one circuit, that function as a plurality of units comprising:

(1) a first acquiring unit configured to acquire the captured image;

(2) a tracking unit configured to execute tracking processing to identify a position of the image of the predetermined object included in the captured image, the tracking unit including a first tracking unit and a second tracking unit configured to execute the tracking processing using different matching methods;

(3) a second acquiring unit configured to acquire situation information indicating a state of the predetermined object and/or an image capture situation of the captured image; and (4) a control unit configured to, on a basis of the situation information, switch to executing the tracking processing using either the first tracking unit or the second tracking unit on a basis of the captured image acquired by the first acquiring unit, wherein the first tracking unit executes the tracking processing using a feature point matching method, wherein the matching method used by the first tracking unit has a lower power consumption associated with executing the tracking processing than the matching method used by the second tracking unit, wherein the situation information includes information of a brightness of an image capture environment associated with the captured image, and wherein the control unit switches to executing the tracking processing using the first tracking unit when the brightness of the image capture environment is less than a predetermined value.

20. An image capturing apparatus comprising:

an image capture unit configured to output a captured image; and the image processing apparatus according to claim 19.

21. A control method for an image processing apparatus for tracking an image of a predetermined object included in an input captured image, the image processing apparatus functioning as a tracking unit configured to execute tracking processing to identify a position of the image of the predetermined object included in the captured image, the tracking unit including a first tracking unit and a second tracking unit configured to execute the tracking processing using different matching methods, the control method comprising:

acquiring the captured image;

acquiring situation information indicating a state of the predetermined object and/or an image capture situation of the captured image; and on a basis of the situation information, switching to executing the tracking processing using either the first tracking unit or the second tracking unit on a basis of the captured image, wherein the first tracking unit executes the tracking processing using a feature point matching method, wherein the matching method used by the first tracking unit has a lower power consumption associated with executing the tracking processing than the matching method used by the second tracking unit wherein the situation information includes information of a brightness of an image capture environment associated with the captured image, and wherein in the switching, the tracking processing is switched to the first tracking unit when the brightness of the image capture environment is less than a predetermined value.

22. A computer-readable storage medium storing a program configured to cause a computer to function as the image processing apparatus according to claim 19.

* * * * *